(12) United States Patent
Dobson

(10) Patent No.: US 12,201,109 B2
(45) Date of Patent: Jan. 21, 2025

(54) METHOD FOR MOSQUITO CONTROL

(71) Applicant: Stephen Dobson, Lexington, KY (US)

(72) Inventor: Stephen Dobson, Lexington, KY (US)

( * ) Notice: Subject to any disclaimer, the term of this patent is extended or adjusted under 35 U.S.C. 154(b) by 0 days.

(21) Appl. No.: 18/188,854

(22) Filed: Mar. 23, 2023

(65) Prior Publication Data

US 2023/0225311 A1      Jul. 20, 2023

Related U.S. Application Data

(62) Division of application No. 13/636,889, filed as application No. PCT/US2012/031437 on Mar. 30, 2012, now abandoned.

(60) Provisional application No. 61/477,781, filed on Apr. 21, 2011.

(51) Int. Cl.
*A01N 25/00* (2006.01)
*A01N 43/40* (2006.01)

(52) U.S. Cl.
CPC ............. *A01N 25/00* (2013.01); *A01N 43/40* (2013.01)

(58) Field of Classification Search
CPC ......... A01N 25/00; A01N 65/00; Y02A 50/30
See application file for complete search history.

(56) References Cited

U.S. PATENT DOCUMENTS

2004/0200128 A1*  10/2004  Metcalfe ............... A01M 1/106
43/107

FOREIGN PATENT DOCUMENTS

JP         1993320001      *   3/1993

* cited by examiner

*Primary Examiner* — Blaine Lankford
*Assistant Examiner* — Lauren K Van Buren
(74) *Attorney, Agent, or Firm* — Stephen J. Weyer, Esq.; Stites & Harbison, PLLC

(57) ABSTRACT

A method for mosquito control is provided in the form of mosquito larvicide carrying insects which can be introduced in a mosquito population to thereby control the mosquito population. The larvicide carrier insects may include artificially generated adult insect carriers of a mosquito larvicide in which the mosquito larvicide has minimal impact on the adult insect carrier and which mosquito larvicide affects juvenile mosquito survival or interferes with metamorphosis of juvenile mosquitoes to adulthood. The larvicide carrier insects may be either male or female and may include mosquitoes and non-mosquito insects.

6 Claims, 3 Drawing Sheets

Examples of individual male mosquitoes analyzed during the study

METHOD FOR MOSQUITO CONTROL

CROSS REFERENCE TO RELATED APPLICATIONS

This is a divisional of U.S. Ser. No. 13/636,889, filed Dec. 19, 2022, which is a § 371 national stage application of PCT/US12/31437, filed Mar. 30, 2012, which claims the benefit of U.S. Provisional Application No. 61/477,781, filed Apr. 21, 2011, all herein incorporated by reference.

FIELD OF THE INVENTION

The present invention relates to a method and a formulation for mosquito control and, in particular, a method and a formulation for mosquito control which includes, but is not limited to, using mosquitoes or other insects for delivering agents, e.g., insecticides such as a larvicide, to an insect population to thereby control the insect population.

BACKGROUND OF THE INVENTION

Malaria, dengue and dengue haemorrhagic fever, West Nile Virus (WNV) and other encephalites, human African trypanosomiasis (HAT), human filariasis, dog heartworm and other pathogens important to animals are on the increase. These diseases are transmitted via insects and, in particular, mosquitoes. Methods for controlling mosquito populations include the use of pesticides and vector control methods.

Existing insecticidal control methods rely upon field technicians, who fail to find and treat many breeding sites, which can be numerous, cryptic and inaccessible. Additional methods consist of area-wide treatment via airplane or wind-assisted dispersal from truck-mounted foggers. Unfortunately, the latter fail to treat many breeding sites and are complicated by variable environmental conditions. Barrera et al., "Population Dynamics of Aedes aegypti and Dengue as Influenced by Weather and Human Behavior in San Juan, Puerto Rico," PLoS Neglected Tropical Diseases, 5:e1378, 2011, describing the effects of various breeding sites on disease.

Surveys of natural and artificial water containers demonstrate mosquitoes and other arthropods to be highly efficient in finding, inhabiting and laying eggs in variously sized, cryptic water pools, including tree holes and gutters high above ground level.

One prior formulation or method for treating mosquito populations includes the use of dissemination stations which are deployed in a target environment. The dissemination stations may be laced with a pesticide, including, but not limited to, a juvenile hormone analog. The dissemination station may include a box or other structure which attracts female mosquitoes. The mosquitoes enter the dissemination station, become exposed to the pesticide or hormone, and carry that hormone back to affect other mosquitoes by mating. An example of this mosquito control is described in the article by Devine et al., entitled "Using adult mosquitoes to transfer insecticides to Aedes aegypti larval habitats," PNAS, vol. 106, no. 28, Jul. 14, 2009.

In tests of another dissemination station, researchers showed that males in the wild that acquire the pesticide from a station can transfer the pesticide to females during copulation. The females receiving pesticide particles via venereal transfer were then shown to cause a significant inhibition of emergence in larval bioassays. This was reported in the article by Gaugler et al, entitled "An autodissemination station for the transfer of an insect growth regulator to mosquito oviposition sites," Med. Vet. Entomol. 2011.

In view of continuing mosquito problems, as noted, additional tools are required to control mosquitoes that are important as nuisance pests and disease vectors.

SUMMARY OF THE INVENTION

The present invention is directed to a novel, self-delivering, insecticidal formulations and delivery techniques. The formulations, in one form, are larvicide treated insects, such as male mosquitoes. The insecticidal formulations can control medically important mosquitoes. These medically important mosquitoes include mosquitoes having an economic or medical importance to animal or human health. Medically important mosquitoes include those listed in the Appendix to this disclosure.

One aspect of the present formulations and delivery techniques relates to a new larvicide treatment for males, as a formulation which can be used to control a mosquito population. The formulation can be generated by exposing adult insects, such as mosquitoes and, in particular, male mosquitoes, to a pesticide, such as a juvenile hormone which affects juvenile survival or interferes with metamorphosis of juvenile mosquitoes and has relatively little impact on adult mosquitoes. Advantageously, the adult insects are exposed to the pesticide in a controlled, factory environment. The factory-reared or captured from the wild adult insects which have been exposed to the pesticide are referred to as direct treated individuals (DTI). The DTI are then released into an environment in which one wishes to control the mosquito population. The DTI control a mosquito population by interacting with untreated individuals (e.g., mating), such that the pesticide, e.g., a larvicide, is communicated to other individuals (known as Indirectly Treated Individuals; ITI)).

In specific further embodiments, the control method uses compounds that affect immature/juvenile stages (eggs, larvae, pupae) more than adults. A list of larvicidal compounds is maintained at the IR-4 Public Health Pesticides Database. Examples of compounds include (1) insect growth regulators such as juvenile hormone mimics or analogs, including methoprene, pyriproxyfen (PPF), and (2) Microbial larvicides, such as *Bacillus thuringiensis* and *Bacillus sphaericus,* herein incorporated by reference. Exemplary compounds are provided in Tables 1-3, below, in the Detailed Description section.

The present invention, in one form thereof, relates to a method for insect control. The method includes introducing insects which carry one or more insecticides comprising at least one larvicide, to an insect population, to thereby control the insect population. In one specific embodiment, the insects are adult males and the method further includes exposing the adult male insects to a pesticide which affects juvenile survival or interferes with metamorphosis of juvenile insects to adulthood, and which pesticide has little impact on adult insects.

In one further, specific embodiment, the insect population is a mosquito population. Further, the juvenile active insecticide (i.e. larvicide) may be within a chemical class (Table 1) or biological class (Table 2). Examples within the chemical class include insect growth regulators, such as juvenile hormone analogs or compounds which mimic juvenile hormones. For example, the larvicide may be pyriproxyfen or methoprene. Examples within the biological class include viruses, bacteria, protozoa, fungi and crustacean organisms or toxic compounds that they produce.

The present invention, in another form thereof, relates to a formulation for insect control which comprises an artificially generated adult insect carrier of a larvicide. The larvicide has minimal impact on the adult insect and the larvicide interferes with metamorphosis of juvenile insects to adulthood. In one specific formulation, the adult insect is a male mosquito and in an alternative form, the larvicide is pyriproxyfen, methoprene and microbial larvicides, including, but not limited to, Bacillus thuringiensis and Bacillus sphaericus.

The present invention, in one specific form is directed to a method for insect control that includes rearing insects in a laboratory or artificially controlled environment. A mosquito larvicide is applied to an exterior surface of the insects in a laboratory or controlled environment to produce insects which carry the mosquito larvicide. When the larvicide carrying insects are released to a mosquito population in the wild, the larvicide carrying insects control the mosquito insect population. The method in one specific further form includes releasing the larvicide carrying insects to a mosquito insect population in the wild to thereby control the mosquito insect population.

The method in one further specific form includes the larvicide carrying insects being non-mosquito insects. Alternatively, the insects can be female insects including female mosquitoes that have been altered to have limited ability to procreate, vector disease or bite.

As an alternative to non-mosquito insects or female mosquito insects as mosquito larvicide carrying insects, the insects can be male insects including male mosquitoes.

In yet a further alternative form, the method of applying one or more mosquito larvicide includes applying a larvicide coating to the surface of the insects, while the insects are in a controlled environment via (i) dusting with a powder, granular or otherwise solid larvicide directly at the insects or (ii) spraying with a liquid insecticide containing the one or more larvicide directed at the insects, wherein the one or more mosquito larvicide has minimal impact on the insects to which the larvicide is applied and which larvicide affects juvenile mosquito survival or interferes with metamorphoses of juvenile mosquito insects to adulthood.

In one specific form the larvicide applied to the insects is sufficient so that when the larvicide coated insects are released from the controlled environment into an environment with an indigenous mosquito population, the larvicide coated insects are effective to deliver a sufficient amount of larvicide to other insects or indigenous spawning sites to affect juvenile mosquito survival or interfere with metamorphoses of juvenile mosquitoes to adulthood, thereby controlling the indigenous mosquito population.

The present invention in one further form thereof is specifically directed to larvicide coated insects which are produced by any of the aforementioned methods described above.

The present invention in yet another further form is directed to insect carriers of mosquito larvicides produced by a method that includes applying a larvicide coating to surfaces of a population of suitable adult insects in a laboratory or controlled environment. The suitable insects are selected from the group consisting of non-mosquito insects, male mosquitoes, and female mosquitoes altered to have limited ability to procreate, vector disease or bite. The coating is applied via dusting with a powder, granular or otherwise solid insecticide directed at the insects or spraying with a liquid insecticide directed at the population of insects. The dusting or spraying produces larvicide coated insects. The insecticide comprises at least one larvicide and the insecticide has minimal impact on the suitable insects and which larvicide affects juvenile mosquito survival or interferes with metamorphoses of juvenile mosquitoes to adulthood. The larvicide coating applied to the insects is sufficient so that when the larvicide coated insects are released from the controlled environment and introduced into an environment with an indigenous mosquito population, the larvicide coated insects are effective to deliver a sufficient amount of larvicide to other insects' indigenous spawning site to affect juvenile mosquito survival or interfere with metamorphose of juvenile mosquitoes to adulthood, thereby controlling the indigenous mosquito population.

DETAILED DESCRIPTION

Figure 1:
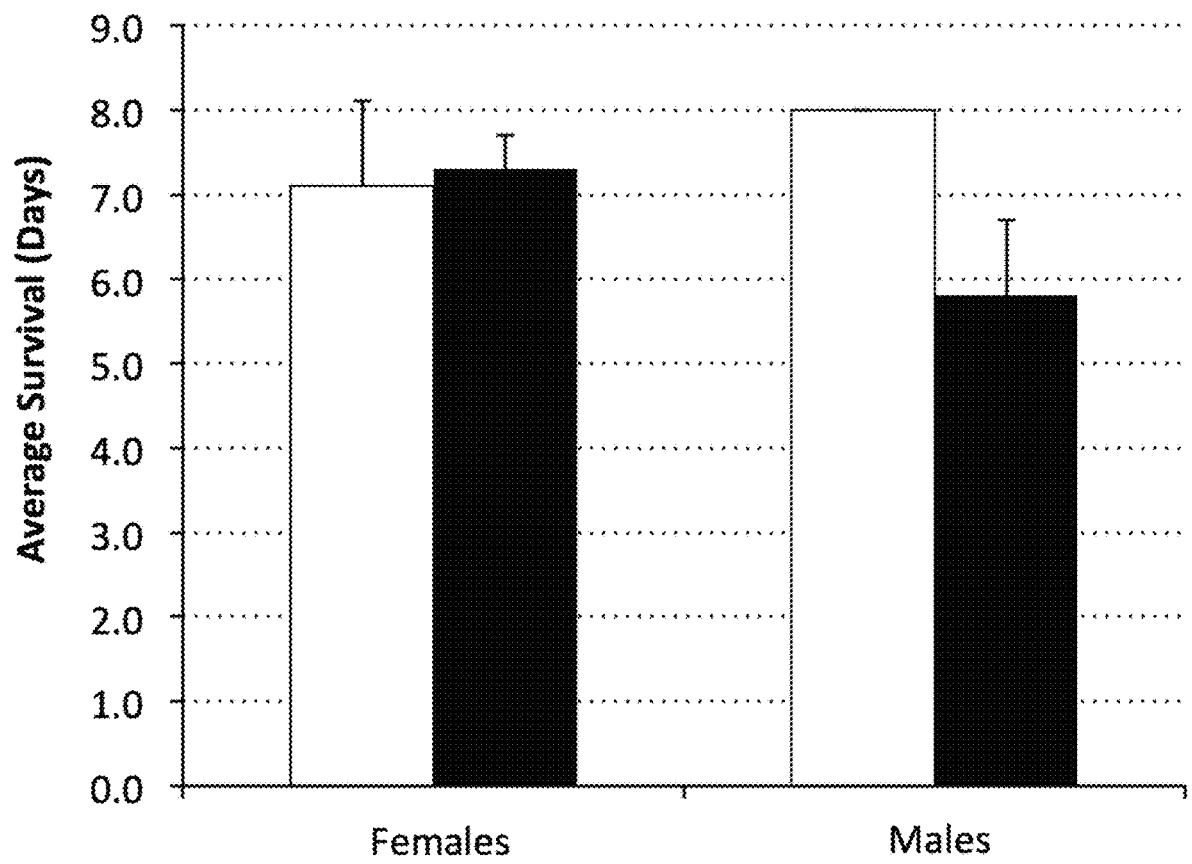
FIG. 1 is a graph showing survival of treated (black) and untreated (white) adults, with bars showing standard deviation, in accordance with the present invention.

The present invention is directed to a method and a formulation for mosquito control. The formulation, in one advantageous form, is larvicide treated males. The treated males are generated from medically important adult male mosquitoes obtained via factory-rearing or captured from the wild. As a demonstration of the chemical class of juvenile active insecticides (Table 1), the adult male mosquitoes are exposed to a larvicide, such as pyriproxyfen (PPF), advantageously in a controlled laboratory or factory environment. PPF is a juvenile hormone mimic which interferes with metamorphosis of juvenile mosquitoes and has relatively little impact on adult mosquitoes. Thus, PPF is commonly used as a mosquito larvicide, but is not used as an adulticide.

The treated males are subsequently referred to as the Direct Treated Individuals (DTI), and this is the insecticidal formulation. The DTI are released into areas with indigenous conspecifics. Male mosquitoes do not blood feed or transmit disease. Accordingly, male mosquitoes provide unique advantages in the present control method as couriers of the larvicide. The DTI interact with untreated individuals (e.g., mating), such that PPF is communicated to the other individuals to produce Indirectly Treated Individuals (ITI). The PPF is delivered by both the DTI and ITI in the wild/in the environment, into the breeding areas, where the PPF accumulates to lethal doses and acts as a larvicide. It is noted that the PPF would impact additional mosquito species that share the same breeding site, providing control of additional mosquito species.

In an alternative control method, female mosquitoes can be used as the DTI. However, female mosquitoes blood feed and can vector disease. The use of female mosquitoes are applicable when the females are incapacitated prior to deployment in the environment and the females have limited procreation ability, bite and vector diseases.

In a further alternative method, other larvicidal active ingredients can be used which include, but are not limited to, compounds that affect juvenile survival or affect immature/juvenile stages of development (eggs, larvae, pupae) more than adults. A list of larvicidal compounds is maintained at the IR-4 Public Health Pesticides Database. Examples of compounds include (1) insect growth regulators such as juvenile hormone mimics or analogs, including methoprene, pyriproxyfen (PPF), and (2) Microbial larvicides, such as *Bacillus thuringiensis* and *Bacillus sphaericus*. Tables 1-3 provide abridged, exemplary lists of suitable compounds.

TABLE 1

Juvenile Active Insecticide - Chemical*

Azadirachtin
Diflubenzuron
Methoprene
Neem Oil (*Azadirachta indica*)
Novaluron
Pyriproxyfen
S-Methoprene
S-Hydropene
Temephos

*A list of Public Health Pesticides is maintained at the IR-4 Public Health Pesticides Database

TABLE 2

Juvenile Active Insecticide - Biological*

*Ascogregarine* spp.
*Bacillus sphaericus*
*Bacillus thuringiensis israelensis*
Baculoviruses
*Copepoda* spp.
*Densovirinae* spp.
*Lagenidium giganteum*
*Microsporida* spp.
Spinosad
Spinosyn

*A list of Public Health Pesticides is maintained at the IR-4 Public Health Pesticides Database

TABLE 3

| Public Health Pesticides from the IR-4 Database* | | |
|---|---|---|
| (−)-cis-Permethrin | Cyfluthrin | Oil of Basil, African Blue (*Ocimum kilimandscharicum* × *basilicum*) |
| (−)-trans-Permethrin | Cyhalothrin | Oil of Basil, Dwarf Bush (*Ocimum basilicum* var. *minimum*) |
| (+)-cis-Permethrin | Cyhalothrin, epimer R157836 | Oil of Basil, Greek Bush (*Ocimum minimum*) |
| (±)-cis,trans-Deltamethrin | Cyhalothrin, Total (Cyhalothrin-L + R157836 epimer) | Oil of Basil, Greek Column (*Ocimum* × *citriodorum* 'Lesbos') |
| (1R)-Alpha-Pinene | Cypermethrin | Oil of Basil, Lemon (*Ocimum americanum*) |
| (1R)-Permethrin | Cyphenothrin | Oil of Basil, Sweet (*Ocimum basilicum*) |
| (1R)-Resmethrin | DDD, o, p | Oil of Basil, Thai Lemon (*Ocimum* × *citriodorum*) |
| (1R,cis) Phenothrin | DDD, other related | Oil of Bay Laurel (*Laurus nobilis*) |
| (1R,trans) Phenothrin | DDD, p, p' | Oil of Cajeput (*Melaleuca leucadendra*) |
| (1S)-Alpha-Pinene | DDE | Oil of Cassumunar Ginger (*Zingiber montanum*) |
| (1S)-Permethrin | DDE, o, p | Oil of Fishpoison (*Tephrosia purpurea*) |
| (E)-Beta-Caryophyllene | DDT | Oil of Ginger (*Zingiber officinale*) |
| 1,1-dichloro-2,2-bis-(4-ethylphenyl) ethane | DDT, o, p' | Oil of Gurjun Balsam (*Dipterocarpus turbinatus* balsam) |
| 1,8-Cineole | DDT, p, p' | Oil of Lemon *Eucalyptus* (*Corymbia citriodora*) |
| 1H-Pyrazole-3-carboxamide, 5-amino-1-[2,6-dichloro-4-(trifluoromethyl)phenyl]-4-[(trifluoromethyl)sulfinyl] | DDVP | Oil of Lemon Mint (*Monarda citriodora*) |
| 1-Naphthol | DDVP, other related | Oil of *Melaleuca* (*Melaleuca* spp.) |
| 1-Octen-3-ol | DEET | Oil of *Myrcia* (*Myrcia* spp.) |
| 2-(2-(p-(diisobutyl) phenoxy) ethoxy) ethyl dimethyl ammonium chloride | Deltamethrin | Oil of Nutmeg (*Myristica fragrans*) |
| 2-butyl-2-ethyl-1,3-propanediol | Deltamethrin (includes parent Tralomethrin) | Oil of Palmarosa (*Cymbopogon martinii*) |
| 2-Hydroxyethyl Octyl Sulfide | Deltamethrin (isomer unspecified) | Orange Oil (*Citrus sinensis*) |
| 2-Isopropyl-4-methyl-6-hydroxypyrimidine | Deltamethrin, other related | Oregano Oil (*Origanum vulgare*) |
| 2-Pyrroline-3-carbonitrile, 2-(p-chlorophenyl)-5-hydroxy-4-oxo-5- | Desmethyl Malathion | Ortho-Phenylphenol |
| 3,7-dimethyl-6-octen-1-ol acetate | Desulfinyl Fipronil | Ortho-Phenylphenol, Sodium Salt |

TABLE 3-continued

Public Health Pesticides from the IR-4 Database*

| | | |
|---|---|---|
| 3,7-dimethyl-6-octen-1-ol acetate | Desulfinylfipronil Amide | Oviposition Attractant A |
| 3-Phenoxybenzoic Acid | Diatomaceous Earth | Oviposition Attractant B |
| 4-Fluoro-3-phenoxybenzoic acid | Diatomaceous Earth, other related | Oviposition Attractant C |
| Absinth Wormwood (*Artemisia absinthium*) | Diazinon | Oviposition Attractant D |
| Absinthin | Diazoxon | Oxymatrine |
| Acepromazine | Dibutyl Phthalate | Paracress Oil (*Spilanthes acmella*) |
| Acetaminophen | Didecyl Dimethyl Ammonium Chloride | P-Cymene |
| Acetamiprid | Dieldrin | Penfluron |
| Acetic Acid | Diethyl Phosphate | Pennyroyal Oil (American False Pennyroyal, *Hedeoma pulegioides*) |
| AI3-35765 | Diethylthio Phosphate | Peppermint (*Mentha × piperita*) |
| AI3-37220 | Diflubenzuron | Peppermint Oil (*Mentha × piperita*) |
| Alkyl Dimethyl Benzyl Ammonium Chloride (60% C14, 25% C12, 15% C16) | Dihydro Abietyl Alcohol | Permethrin |
| Alkyl Dimethyl Benzyl Ammonium Chloride (60% C14, 30% C16, 5% C12, 5% C18) | Dihydro-5-heptyl-2(3H)-furanone | Permethrin, other related |
| Alkyl Dimethylethyl Benzyl Ammonium Chloride (50% C12, 30% C14, 17% C16, 3% C18) | Dihydro-5-pentyl-2(3H)-furanone | Phenothrin |
| Alkyl Dimethylethyl Benzyl Ammonium Chloride (68% C12, 32% C14) | Dimethyl Phosphate | Phenothrin, other related |
| Allethrin | Dimethyldithio Phosphate | Picaridin |
| Allethrin II | Dimethylthio Phosphate | Pine Oil (*Pinus pinea* = Stone Pine) |
| Allethrins | Dinotefuran | Pine Oil (*Pinus* spp.) |
| Allicin | Dipropyl Isocinchomeronate (2,5 isomer) | Pine Oil (*Pinus sylvestris* = Scots Pine) |
| Allyl Caproate | Dipropyl Isocinchomeronate (3,5 isomer) | Pine Tar Oil (*Pinus* spp.) |
| Allyl Isothiocyanate | Dipropylene Glycol | Pinene |
| Alpha-Cypermethrin | d-Limonene | Piperine |
| Alpha-Ionone | d-Phenothrin | Piperonyl Butoxide |
| Alpha-Pinene | Dried Blood | Piperonyl Butoxide, technical, other related |
| Alpha-Terpinene | d-trans-Beta-Cypermethrin | Pirimiphos-Methyl |
| Aluminum Phosphide | Esfenvalerate | PMD (p-Menthane-3,8-diol) |
| Amitraz | Ester Gum | Potassium Laurate |
| | | Potassium Salts of Fatty Acids |
| Ammonium Bicarbonate | Estragole | |
| Ammonium Fluosilicate | Etofenprox | Potassium Sorbate |
| Anabasine | *Eucalyptus* Oil (*Eucalyptus* spp.) | Prallethrin |
| Anabsinthine | Eugenol | Propoxur |
| Andiroba Oil (*Carapa guianensis*) | Eugenyl Acetate | Propoxur Phenol |
| Andiroba Oil (*Carapa procera*) | Extract of *Piper* spp. | Propoxur, other related |
| Andiroba, African (*Carapa procera*) | Extracts of Common Juniper (*Juniperus communis*) | Putrescent Whole Egg Solids |
| Andiroba, American (*Carapa guianensis*) | Fenchyl Acetate | Pyrethrin I |
| Anethole | Fenitrothion | Pyrethrin II |
| Anise (*Pimpinella anisum*) | Fennel (*Foeniculum vulgaris*) | Pyrethrins |
| Aniseed Oil (*Pimpinella anisum*) | Fennel Oil (*Foeniculum vulgaris*) | Pyrethrins and Pyrethroids, manufg. Residues |
| Atrazine | Fenoxycarb | Pyrethrins, other related |
| Avermectin | Fenthion | Pyrethrum |
| Azadirachtin | Fenthion Oxon | Pyrethrum Marc |
| Azadirachtin A | Fenthion Sulfone | Pyrethrum Powder other than Pyrethrins |
| *Bacillus sphaericus* | Fenthion Sulfoxide | Pyriproxyfen |
| *Bacillus sphaericus*, serotype H-5A5B, strain 2362 | *Ferula hermonis* | Pyrrole-2-carboxylic acid, 3-bromo-5-(p-chlorophenyl)-4-cyano- |
| | | Pyrrole-2-carboxylic acid, 5- |

TABLE 3-continued

Public Health Pesticides from the IR-4 Database*

| | | |
|---|---|---|
| *Bacillus thuringiensis israelensis* | *Ferula hermonis* Oil | (p-chlorophenyl)-4-cyano- (metabolite of AC 303268) |
| *Bacillus thuringiensis israelensis*, serotype H-14 | Finger Root Oil (*Boesenbergia pandurata*) | *Quassia* |
| *Bacillus thuringiensis israelensis*, strain AM 65-52 | Fipronil | Quassin |
| *Bacillus thuringiensis israelensis*, strain BK, solids, spores, and insecticidal toxins, ATCC number 35646 | Fipronil Sulfone | R-(−)-1-Octen-3-ol |
| *Bacillus thuringiensis israelensis*, strain BMP 144 | Fipronil Sulfoxide | Red Cedar Chips (*Juniperus virginiana*) |
| *Bacillus thuringiensis israelensis*, strain EG2215 | Fragrance Orange 418228 | Resmethrin |
| *Bacillus thuringiensis israelensis*, strain IPS-78 | Gamma-Cyhalothrin | Resmethrin, other related |
| *Bacillus thuringiensis israelensis*, strain SA3A | Garlic (*Allium sativum*) | Rhodojaponin-III |
| Balsam Fir Oil (*Abies balsamea*) | Garlic Chives Oil (*Allium tuberosum*) | Rose Oil (*Rosa* spp.) |
| Basil, Holy (*Ocimum tenuiflorum*) | Garlic Oil (*Allium sativum*) | Rosemary (*Rosmarinus officinalis*) |
| Bendiocarb | Geraniol | Rosemary Oil (*Rosmarinus officinalis*) |
| Benzyl Benzoate | Geranium Oil (*Pelargonium graveolens*) | Rosmanol |
| Bergamot Oil (*Citrus aurantium bergamia*) | Glyphosate, Isopropylamine Salt | Rosmaridiphenol |
| Beta-Alanine | Hexaflumuron | Rosmarinic Acid |
| Beta-Caryophyllene | Hydroprene | Rotenone |
| Beta-Cyfluthrin | Hydroxyethyl Octyl Sulfide, other related | R-Pyriproxyfen |
| Beta-Cypermethrin | Imidacloprid | R-Tetramethrin |
| Beta-Cypermethrin ([(1R)-1a(S*),3a] isomer) | Imidacloprid Guanidine | Rue Oil (*Ruta chalepensis*) |
| Beta-Cypermethrin ([(1R)-1a(S*),3b] isomer) | Imidacloprid Olefin | Ryania |
| Beta-Cypermethrin ([(1S)-1a((R*),3a] isomer) | Imidacloprid Olefinic-Guanidine | Ryanodine |
| Beta-Cypermethrin ([(1S)-1a(R*),3b] isomer) | Imidacloprid Urea | S-(+)-1-Octen-3-ol |
| Beta-Myrcene | Imiprothrin | Sabinene |
| Beta-Pinene | Indian Privet Tree Oil (*Vitex negundo*) | Sabinene |
| Betulinic Acid | Ionone | Sage Oil (*Salvia officinalis*) |
| Bifenthrin | IR3535 (Ethyl Butylacetylaminopropionate) | Sassafras Oil (*Sassafras albidum*) |
| Billy-Goat Weed Oil (*Ageratum conyzoides*) | Isomalathion | *Schoenocaubn officinale* |
| Bioallethrin = d-trans-Allethrin | Isopropyl Alcohol | S-Citronellol |
| Biopermethrin | Japanese Mint Oil (*Mentha arvensis*) | Sesame (*Sesamum indicum*) |
| Bioresmethrin | Jasmolin I | Sesame Oil (*Sesamum indicum*) |
| Bitter Orange Oil (*Citrus aurantium*) | Jasmolin II | Sesamin |
| Blend of Oils: of Lemongrass, of Citronella, of Orange, of Bergamot; Geraniol, Ionone Alpha, Methyl Salicylate and Allylisothioc | Kerosene | Sesamolin |
| Boric Acid | L-(+)-Lactic acid | S-Hydroprene |
| Borneol | Lactic Acid | Silica Gel |
| Bornyl Acetate | *Lagenidium giganteum* | Silver Sagebrush (*Artemisia cana*) |
| Bromine | *Lagenidium giganteum* (California strain) | Silver Sagebrush Oil (*Artemisia cana*) |
| Butane | Lambda-Cyhalothrin | S-Methoprene |
| Butoxy Poly Propylene Glycol | Lambda-Cyhalothrin R ester | Sodium Chloride |
| Caffeic Acid | Lambda-Cyhalothrin S ester | Sodium Lauryl Sulfate |
| Camphene | Lambda-Cyhalothrin total | Solvent Naphtha (Petroleum), Light Aromatic |
| Camphor | Lauryl Sulfate | Soybean Oil (*Glycine max*) |
| Camphor Octanane | Lavender Oil (*Lavendula angustifolia*) | Spinosad |
| Canada Balsam | Leaves of *Eucalyptus* (*Eucalyptus* spp.) | Spinosyn A |

TABLE 3-continued

| Public Health Pesticides from the IR-4 Database* | | |
|---|---|---|
| Carbaryl | Leech Lime Oil (*Citrus hystrix*) | Spinosyn D |
| Carbon Dioxide | Lemon Oil (*Citrus limon*) | Spinosyn Factor A Metabolite |
| Carnosic Acid | Licareol | Spinosyn Factor D Metabolite |
| Carvacrol | Limonene | S-Pyriproxyfen |
| Caryophyllene | Linalool | Succinic Acid |
| Cassumunar Ginger Oil (*Zingiber montanum*) | Linalyl Acetate | Sulfoxide |
| Castor Oil (*Ricinus communis*) | Linseed Oil (*Linum usitatissimum*) | Sulfoxide, other related |
| Catnip Oil (*Nepeta cataria*) | *Lonchocarpus utilis* (Cubé) | Sulfur |
| Catnip Oil, Refined (*Nepeta cataria*) | Lupinine | Sulfuryl Fluoride |
| Cedarwood Oil (*Callitropsis nootkatensis* = Nootka Cypress, Alaska Yellow Cedarwood) | Magnesium Phosphide | Sweet Gale Oil (*Myrica gale*) |
| Cedarwood Oil (*Cedrus deodara* = Deodar Cedar) | Malabar (*Cinnamomum tamala*) | Tangerine Oil (*Citrus reticulata*) |
| Cedarwood Oil (*Cedrus* spp. = True Cedars) | Malabar Oil (*Cinnamomum tamala*) | Tansy Oil (*Tanacetum vulgare*) |
| Cedarwood Oil (*Cupressus funebris* = Chinese Weeping Cypress) | Malaoxon | Tar Oils, from Distillation of Wood Tar |
| Cedarwood Oil (*Cupressus* spp. = Cypress) | Malathion | Tarragon Oil (*Artemisia dracunculus*) |
| Cedarwood Oil (Juniper and Cypress) | Malathion Dicarboxylic Acid | Tarwood Oil (*Laxostylis alata*) |
| Cedarwood Oil (*Juniperus ashei* = Ashe's Juniper, Texan Cedarwood) | Malic Acid | tau-Fluvalinate |
| Cedarwood Oil (*Juniperus macropoda* = Pencil Cedar) | Marigold Oil (*Tagetes minuta*) | Teflubenzuron |
| Cedarwood Oil (*Juniperus* spp.) | Matrine | Temephos |
| Cedarwood Oil (*Juniperus virginiana* = Eastern Redcedar, Southern Redcedar) | Menthone | Temephos Sulfoxide |
| Cedarwood Oil (Oil of Juniper Tar = *Juniperus* spp.) | Metaflumizone | Terpinene |
| Cedarwood Oil (*Thuja occidentalis* = Eastern Arborvitae) | Metarhizium anisopliae Strain F52 Spores | Terpineol |
| Cedarwood Oil (*Thuja* spp. = Arborvitae) | Methoprene | Tetrachlorvinphos, Z-isomer |
| Cedarwood Oil (unspecified) | Methoprene Acid | Tetramethrin |
| Cedrene | Methyl Anabasine | Tetramethrin, other related |
| Cedrol | Methyl Bromide | Theta-Cypermethrin |
| Chevron 100 Neutral Oil | Methyl Cinnamate | Thiamethoxam |
| Chlordane | Methyl cis-3-(2 2-dichlorovinyl)-2 2-dimethylcyclopropane-1-carboxylate | Thujone |
| Chlorfenapyr | Methyl Eugenol | Thyme (*Thymus vulgaris*) |
| Chloropicrin | Methyl Nonyl Ketone | Thyme Oil (*Thymus vulgaris*) |
| Chlorpyrifos | Methyl Salicylate | Thymol |
| Cinerin I | Methyl trans-3-(2 2-dichlorovinyl)-2 2-dimethylcyclopropane-1-carboxylate | Timur Oil (*Zanthoxylum alatum*) |
| Cinerin II | Metofluthrin | Tralomethrin |
| Cinerins | MGK 264 (N-octyl Bicycloheptene Dicarboximide) | trans-3-(2,2-Dichlorovinyl)-2,2-dimethylcyclopropane carboxylic acid |
| Cinnamon (*Cinnamomum zeylanicum*) | Mineral Oil | Trans-Alpha-Ionone |
| Cinnamon Oil (*Cinnamomum zeylanicum*) | Mineral Oil, Petroleum Distillates, Solvent Refined Light | Transfluthrin |

TABLE 3-continued

Public Health Pesticides from the IR-4 Database*

| | | |
|---|---|---|
| cis-3-(2,2-Dichlorovinyl)-2,2-dimethylcyclopropane carboxylic acid | Mixture of Citronella Oil, Citrus Oil, Eucalyptus Oil, Pine Oil | trans-Ocimene |
| cis-Deltamethrin | MMF (Poly (oxy-1,2-ethanediyl), alpha-isooctadecyl-omega-hydroxy) | Transpermethrin |
| Cismethrin | Mosquito Egg Pheromone | trans-Resmethrin |
| cis-Permethrin | Mugwort (*Artemisia vulgaris*) | Trichlorfon |
| Citral | Mugwort Oil (*Artemisia vulgaris*) | Triethylene Glycol |
| Citric Acid | Mustard Oil (*Brassica* spp.) | Triflumuron |
| Citronella (*Cymbopogon winterianus*) | Myrcene | Trifluralin |
| Citronella Oil (*Cymbopogon winterianus*) | Naled | Turmeric Oil (*Curcuma aromatica*) |
| Citronellal | Neem Oil (*Azadirachta indica*) | Uniconizole-P |
| Citronellol | *Nepeta cataria* (Catnip) | Ursolic Acid |
| Citrus Oil (*Citrus* spp.) | Nepetalactone | Veratridine |
| Clove (*Syzygium aromaticum*) | Nicotine | *Verbena* Oil (*Verbena* spp.) |
| Clove Oil (*Syzygium aromaticum*) | Nonanoic Acid | Verbenone |
| CME 13406 | Nornicotine | Violet Oil (*Viola odorata*) |
| Coriander Oil (*Coriandrum sativum*) | Novaluron | White Pepper (*Piper nigrum*) |
| Coriandrol | Ocimene | Wintergreen Oil (*Gaultheria* spp.) |
| *Coriandrum sativum* (Coriander) | *Ocimum* × *citriodorum* (Thai Lemon Basil) | Wood Creosote |
| Corn Gluten Meal | *Ocimum* × *citriodorum* 'Lesbos' (Greek Column Basil) | Wood Tar |
| Corn Oil (*Zea mays* ssp. *Mays*) | *Ocimum americanum* (Lemon Basil) | Wormwood Oil (*Artemisia absinthium*) |
| *Corymbia citriodora* (Lemon Eucalyptus) | *Ocimum basilicum* (Sweet Basil) | Ylang-ylang Oil (*Canagium odoratum*) |
| Cottonseed Oil (*Gossypium* spp.) | *Ocimum basilicum* var. *minimum* (Dwarf Bush Basil) | Zeta-Cypermethrin |
| Coumaphos | *Ocimum kilimandscharicum* × *basilicum* (African Blue Basil) | Zinc Metal Strips |
| Cryolite | *Ocimum minimum* (Greek Bush Basil) | |
| Cubé Extracts (*Lonchocarpus utilis*) | Oil of Balsam Peru (*Myroxylon pereirae*) | |

*A list of Public Health Pesticides is maintained at the IR-4 Public Health Pesticides Database; Version from March 2012

In yet another alternative method, the aforementioned methods can be applied to additional susceptible arthropods, including economically and medically important pests (including animal and human health), where one life stage and/or sex does not cause direct damage.

In other alternative delivery techniques, the present method can be applied using non-targeted, beneficial or non-pest arthropods that utilize the same breeding site as the targeted arthropod. For example, the DTI could be PPF-treated arthropods that come in contact with the targeted insect's breeding sites. As an example, Oytiscidae adults (Predaceous Diving Beetles) could be reared or field collected and treated with PPF to become the DTI. Additional candidate insects that could serve as the DTI include, but are not limited to: Diptera (e.g., Tipulidae, Chironomidae, Psychodidae, Ceratapogonidae, Cecidomyiidae, Syrphidae, Sciaridae, Stratiomyiidae, Phoridae), Coleoptera (e.g., Staphylinidae, Scirtidae, Nitidulidae, Oytiscidae, Noteridae) and Hemiptera (e.g., Pleidae, Belostomatidae, Corixidae, Notonectidae, Nepidae).

An additional benefit of the latter strategy (i.e. non-Culicid DTI) is that the DTI may be easier to rear, larger size (allowing increased levels of PPF), be less affected by the PPF, or have an increased probability of direct contact with the breeding site of the targeted arthropod (i.e. not necessarily rely on transfer of the PPF via mating, improved location of breeding sites).

It is noted that the species of DTI would vary based upon the specific application, habitat and location. For example, the regulatory issues may be simplified if the species used for DTI were indigenous. However, it is noted that there are numerous examples of exotic arthropods being imported for biological control. Furthermore, different DTI species may be more/less appropriate for urban, suburban and rural environments.

Referring to the following examples for exemplary purposes only, but not to limit the scope of the invention in any way, *Aedes albopictus* were used in experiments from a colony established in 2008 from Lexington, Ky. *Callosobrochus maculatus* were purchased from Carolina Biological Supply Company (Burlington, N.C.) and maintained on mung beans (*Vigna radiata*). Rearing and experiments were performed in ambient conditions (~25° C.; 80% humidity). Larvae were reared in pans with ~500 ml water and crushed cat food (Science Diet; Hill's Pet Nutrition, Inc.). Adults were provided with raisins as a sugar source. For line maintenance, females were blood fed by the author.

Sumilary 0.5G was generously provided by Sumitomo Chemical (London, UK). Liquid PPF was purchased from Pest Control Outlet (New Port Richey, Fla.). *Bacillus thuringiensis* subspecies israelensis technical powder was purchased from HydroToYou (Bell, Calif.). For application, Sumilary granules were crushed into a fine powder and applied using a bellows-type dusting apparatus (J.T. Eaton Insecticidal Duster #530; Do-it-yourself Pest Control, Suwanee, Ga.). Liquid PPF was applied using a standard squirt bottle (WalMart, Lexington, Ky.). Treated adults were held in individualized bags with a raisin as a sucrose source until used in larval bioassays. Larval bioassays were performed in 3 oz. Dixie Cups (Georgia-Pacific, Atlanta, Ga.) containing ten L3 larvae, 20 ml water and crushed cat food.

Referring to methods for the larvicide application to the selected mosquito larvicide carrier insects in powder by dusting or liquid by spraying insects, any application technique known to those skilled in the art can be used. For example, the method disclosed in JP5-320001 (hereinafter incorporated by reference) describes spraying its captured female mosquitoes with a larvicide while the mosquitoes are contained. See JP5-320001, paragraph [0015]. Further, reference is made to the book entitled Mosquito Ecology—Field Sampling Methods, John B. Silver, 2008, Chapter 14 (herein incorporated by reference), which describes dusting target insects which are necessarily contained or confined such as in wire cages with mosquito netting.

As a person skilled in the art will appreciate, flying insects necessarily require confinement during a larvicide application process.

Figure 2:
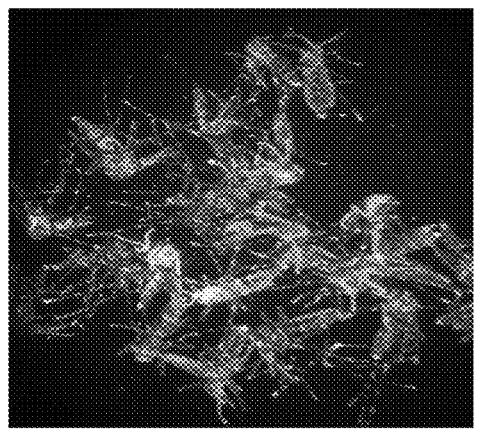
FIG. 2 is a photograph showing larvicide coated mosquitoes.

Dusting or spraying insects in a confined space with a larvicide produces a larvicide coating essentially over the entire exterior surface of the target insects. FIG. 2 is a photograph showing the complete larvicide coating of the target insects (mosquitoes in the photograph). It is important to note that portions of the insects' wings, back, abdomen, tarsi ("feet") and other parts will necessarily be coated.

Adult treatment does not affect survival. Male and female *Ae. albopictus* treated with pulverized Sumilary showed good survival in laboratory assays, which is indistinguishable from that of untreated control individuals. In an initial assay, 100% survival was observed for adults in both the Sumilary treated (n=8 replications) and untreated control groups (n=2 replications) during a two-day observation period. In a second comparison, adults were monitored for eight days. Similar to the initial experiment, no difference was observed between the treated and control groups. Specifically, a similar average longevity was observed comparing the Sumilary treated (6.3±2.0 days; n=4) and undusted control (7.3 days; n=1) groups. In a third experiment, treated and untreated adults were separated by sex and monitored for eight days. Similar to prior experiments, survival was not observed to differ between the treated and untreated groups (Figure).

In a separate experiment, the survival of beetles (*Callosobrochus maculatus*) dusted with Sumilary were compared to an undusted control group. In both the treatment and control groups, 100% survival was observed during the four day experiment.

To assess the larvicidal properties of treated adults, Sumilary dusted adults and undusted control adults were placed individually into bioassay cups with larvae. No adults eclosed from the five assay cups receiving a treated adult; in contrast, high levels of adult eclosion was observed from all four control assay cups that received an untreated adult. Chi square analysis shows the adult eclosion resulting in assays receiving a treated adult to be significantly reduced compared to that in the control group (X2 (1, N=9)=12.37, p<0.0004). The bioassay experiment was repeated in a subsequent, larger experiment, yielding similar results; adult eclosion in the treated group was significantly reduced compared to the control group (X2 (1, N=24)=13.67, p<0.0002).

A similar bioassay was used to assess the larvicidal properties of treated beetles. Similar to the prior results, adult eclosion from assays in the treated beetle group was significantly reduced compared to the control group (X2 (1, N=14)=13.38, p<0.0003).

To examine an additional formulation of PPF, an identical bioassay was performed, but a liquid PPF solution was applied (using the techniques disclosed herein) to mosquito adults, instead of Sumilary dust. Similar to the prior results, adult eclosion in the treated group was significantly reduced compared to the control group (X2 (1, N=14)=16.75, p<0.0001).

To examine an example of the biological class of juvenile active insecticides (Table 2) and different active ingredients, an identical bioassay was performed, but a powder formulation of *Bacillus thuringiensis* subspecies israelensis technical powder was applied to mosquito adults, using the same method as the Sumilary dust. Similar to the prior results, no difference was observed between the longevity of treated versus untreated adults (X2 (1, N=15)=3.2308, p>0.09). Upon exposing larvae to treat adults, eclosion was significantly reduced compared to the control group (X2 (1, N=28)=15.328, p<0.0001).

The results demonstrate that *C. maculatus* and *A. albopictus* adults do not experience reduced survival resulting from direct treatment with the insecticides. Specifically, the survival of treated mosquitoes and beetles did not differ significantly from that of the untreated conspecifics. The results are consistent with the traits required for the proposed application of treated adults as a self-delivering larvicide. Treated adults must survive, disperse and find breeding sites under field conditions. The results of the feasibility assays reported here provide evidence of an advantageous method of mosquito or other arthropod control.

Bioassays characterizing the larvicidal properties of treated adults show significant lethality resulting from the presence of treated mosquitoes and beetles. Similar results were observed for multiple formulations (i.e. dust and liquid) and multiple active ingredients. Furthermore, representative examples from each of the chemical and biological classes (Tables 1 and 2) of juvenile active insecticides have been demonstrated. This is also consistent with those traits required for the proposed application of treated arthropods as a self-delivering insecticide. Specifically, treated arthropods that reach mosquito breeding sites can be expected to impact immature mosquitoes that are present at the site.

Experiment

The following experiment demonstrates the effectiveness of complete larvicide coating on target mosquito larvicide carrier insects.

The following experiment shows how a larvicide coating applied to insects by (1) dusting with a powder and (2) spraying with a liquid. The experiment demonstrates coverage using the spraying and dusting techniques described above.

Prior to the release of mosquitoes (larvicide carrier insects), dusting or liquid spraying techniques were used to treat mosquitoes held in a confined area (e.g. cage): 1) a dusting application using a powder-based formulation and 2) a spray application using a liquid formulation. One group of 1000 mosquitoes was treated with dust. A second group of 1000 mosquitoes was sprayed. And a third group was sprayed with water (negative control). For each application method, 100 individuals from each group were randomly selected and analyzed. The spraying and dusting was done in accordance with the disclosed techniques of the present disclosure.

Figure 3:
FIG. 3 is a table with photographs showing mosquitoes with larvicide coating.

Each group was analyzed under a UV microscope to assess coverage. Coverage was assessed for the head, thorax, abdomen and legs of each individual. Presence of the larvicide was indicated by fluorescing particles located on each body part (FIG. 3). Results demonstrate the application methods provided a consistent rate of coverage per application method (FIG. 2). The dusting application method resulted in a heavier pesticide load when compared to the liquid application method. However, for both application methods, all body parts analyzed were found to have pesticide particles present for all individuals assessed (Table 4). No fluorescing particles were identified on individuals within the water-treated control group assessed in the study.

TABLE 4

Coverage results of individuals analyzed for the presence of pesticide following ADAM applications

| Application Method | Individuals Analyzed | Head Present | Head Absent | Thorax Present | Thorax Absent | Abdomen Present | Abdomen Absent | Legs Present | Legs Absent |
|---|---|---|---|---|---|---|---|---|---|
| Control | 100 | 0 | 100 | 0 | 100 | 0 | 100 | 0 | 100 |
| Dusting | 100 | 100 | 0 | 100 | 0 | 100 | 0 | 100 | 0 |
| Spray | 100 | 100 | 0 | 100 | 0 | 100 | 0 | 100 | 0 |

Table 4 shows 100% of the insects sprayed and dusted had their entire head, thorax, abdomen and legs covered with the larvicide.

It will now be clear that the present invention is directed to aw novel formulation and method for treating insect populations, including, but not limited to, mosquito populations. Unlike prior control methods that disseminate a pesticide using dissemination stations, followed by an insect in the wild entering the dissemination station to become treated with the pesticide, the present formulation and method starts with generating insect carriers in an artificial controlled environment or setting. The insect carriers can either be factory-reared or adults captured from the wild. Subsequently, the carriers are released into an environment as the control agent or formulation. Thus, the carriers, i.e. the insects with the pesticide/larvicide, are the formulation for insect control, whereas, in prior methods and formulations, the formulation is a treated dissemination station, not a treated insect.

One of ordinary skill in the art will recognize that the present treatment, which targets insect larvae, offers advantages over prior art techniques of insect control which target adult insects. The present method is a trans-generation insect control technique which targets the next generation of insects, whereas prior techniques target the present generation, i.e. adult insects. For example, Garcia-Munguia et al., "Transmission of *Beauveria bassiana* from male to female *Aedes aegypti* mosquitoes," Parasites & Vectors, 4:24, 2011 is a paper published on Feb. 26, 2011 describing mosquito control of adults and, thus, the paper describes the killing of the present generation of insects. The Garcia-Munguia paper describes using fungus-treated males to deliver insecticidal fungus to adult females. The fungus shortens the female lifespan and reduces fecundity of adult females. This type of approach (using insects to deliver an adulticide) is not particularly novel, and has been used in several important insect species, including examples described in Baverstock et al., "Entomopathogenic fungi and insect behaviour: from unsuspecting hosts to targeted vectors," Biocontrol, 55:89-102, 2009.

As described above, the present technique uniquely uses factory-treatment of adult insects with a larvicide in which the larvicide is chemical or biological in nature. No prior technique includes the manufacturing of larvicidal-treated insects for trans-generational delivery. Further, unlike prior techniques that treat adults with fungi that kills adults, the present technique merely treats adult males with larvicidal compounds which do not kill the adult males; rather, the treatment delivers the larvicidal compounds in a trans-generational delivery to kill the next generation, i.e. larvae.

Advantages which follow from the present technique include using the adults treated with the larvicide to communicate the larvicide to other adults through the lifespan of the initially treated adult insect. As a result, there is an exponential effect of the present technique which delivers a larvicide using treated adults to transfer the treatment to other adults, rather than prior techniques which kill the adult insect.

Further, the present technique delivers the larvicide by the treated adults into breeding sites where the larvicide can affect and kill thousands of developing, immature mosquitoes. This technique is unlike prior techniques which merely target the adults and, thus, only kill the directly affected adults and not thousands of developing, immature mosquitoes, i.e. a next generation of insects.

In addition, the present technique allows for the treatment of insect breeding sites, including cryptic, i.e. previously unknown, breeding sites which prior insect control techniques do not treat.

Further, the present technique allows one to affect insect populations of the species of a treated insect, as well as other species which share a common breeding site. Since the present technique uses adult insects to deliver a larvicide to a breeding site, the present technique allows for the transmission of a larvicide to breeding sites which may be common among more than one insect species. As a result, the present technique can target the species of the treated insect, as well as insects which share a common breeding site.

In addition, in contrast to adulticide methods, the present larvicide technique allows a pesticide to persist in a breeding site after the treated insect has departed or died.

One additional advantage of the present method is that the agents being disseminated are the insects themselves, as carriers of the insecticide which will directly affect an insect population. Prior formulation and methods require indirect dissemination, in which insects of a population in the wild must first find a dissemination station, acquire an appropriate dose of the insecticide, and then return to the population with the larvicide of a dissemination station in order to have an affect on the insect population.

It will now be clear to one of ordinary skill in the art that the present formulation of pesticide carrier insects and the present method for controlling insect populations based on the present experiments. For example, if the insects have a larval stage, adult insects can be used as carriers of larvicides which have minimal affect on the adult insect, but are lethal to the larvae, thereby controlling the insect population.

While the invention has been described in connection with numerous embodiments, it is to be understood that the specific mechanisms and techniques which have been described are merely illustrative of the principles of the invention, numerous modifications may be made to the methods and apparatus described without departing from the spirit and scope of the invention.

What is claimed is:

1. A method for mosquito control, comprising:
applying in a laboratory or artificially controlled environment, one or more mosquito larvicides to an exterior surface of adult male mosquitoes, that were reared in a laboratory or artificially controlled environment, to produce larvicide carrying adult male mosquitoes; and
delivering said larvicide carrying adult male mosquitoes for treatment of a mosquito breeding site to thereby control a mosquito population.

2. The method of claim 1, wherein applying one or more mosquito larvicides comprises applying a larvicide coating to the surface of the adult male mosquitoes via (i) dusting with a powder, granular or otherwise solid larvicide directed at the adult male mosquitoes or (ii) spraying with a liquid insecticide containing the one more larvicides directed at the adult male mosquitoes, wherein said the one or more mosquito larvicides has minimal impact on the adult male mosquitoes to which the larvicide is applied and which larvicide affects juvenile male mosquito survival or interferes with metamorphosis of juvenile male mosquito insects to adulthood.

3. The method of claim 2, wherein the larvicide coating applied to the adult male mosquitoes is sufficient so that when the larvicide coated adult male mosquitoes are released from the controlled environment and introduced into an environment with an indigenous mosquito population, the larvicide coated adult male mosquitoes are effective to deliver a sufficient amount of larvicide to an indigenous mosquito spawning or breeding sites to affect juvenile mosquito survival or interfere with metamorphosis of juvenile mosquito insects to adulthood, thereby controlling the indigenous mosquito population.

4. A method for mosquito control, comprising:
releasing to a mosquito breeding site, adult male mosquitoes that were reared in a laboratory or artificially controlled environment, said adult male mosquitoes having one or more larvicides applied to an exterior surface of the adult male mosquitoes in a laboratory or artificially controlled environment, to thereby control a mosquito population.

5. The method of claim 4, further comprising applying the one or more mosquito larvicides to an exterior surface of adult male mosquitoes via (i) dusting with a powder, granular or otherwise solid larvicide directed at the adult male mosquitoes or (ii) spraying with a liquid insecticide containing the one more larvicides directed at the adult male mosquitoes, wherein said the one or more mosquito larvicides has minimal impact on the adult male mosquitoes to which the larvicide is applied and which larvicide affects juvenile male mosquito survival or interferes with metamorphosis of juvenile male mosquito insects to adulthood.

6. The method of claim 5, wherein the larvicide coating applied to the adult male mosquitoes is sufficient so that when the larvicide coated adult male mosquitoes are released from the controlled environment and introduced into an environment with an indigenous mosquito population, the larvicide coated adult male mosquitoes are effective to deliver a sufficient amount of larvicide to an indigenous mosquito spawning or breeding sites to affect juvenile mosquito survival or interfere with metamorphosis of juvenile mosquito insects to adulthood, thereby controlling the indigenous mosquito population.

* * * * *